US007333889B2

(12) United States Patent
Hashizume

(10) Patent No.: US 7,333,889 B2
(45) Date of Patent: Feb. 19, 2008

(54) CAR NAVIGATION SYSTEM

(75) Inventor: Masayuki Hashizume, Kariya (JP)

(73) Assignee: DENSO CORPORATION, Kariya (JP)

( * ) Notice: Subject to any disclaimer, the term of this patent is extended or adjusted under 35 U.S.C. 154(b) by 316 days.

(21) Appl. No.: 11/229,601

(22) Filed: Sep. 20, 2005

(65) Prior Publication Data

US 2006/0069500 A1    Mar. 30, 2006

(30) Foreign Application Priority Data

Sep. 27, 2004 (JP) ............. 2004-280047
Jul. 14, 2005 (JP) ............. 2005-205970

(51) Int. Cl.
*G01C 21/36* (2006.01)
(52) U.S. Cl. ............... 701/211; 701/209; 340/995.13; 340/995.2
(58) Field of Classification Search ............ 701/200, 701/209, 210, 211; 340/995.1, 995.13, 995.19, 340/995.2, 995.21
See application file for complete search history.

(56) References Cited

U.S. PATENT DOCUMENTS

| 5,905,451 A | 5/1999 | Sakashita |
| 5,977,885 A * | 11/1999 | Watanabe ............ 340/995.19 |
| 6,064,941 A * | 5/2000 | Nimura et al. ............ 701/210 |
| 6,202,026 B1 * | 3/2001 | Nimura et al. ............ 701/211 |
| 6,700,505 B2 * | 3/2004 | Yamashita et al. ......... 340/988 |
| 2006/0080034 A1* | 4/2006 | Hayashi ..................... 701/211 |

FOREIGN PATENT DOCUMENTS

| JP | B2-2785528 | 2/1993 |
| JP | A-2000-346664 | 12/2000 |

* cited by examiner

Primary Examiner—Gary Chin
(74) Attorney, Agent, or Firm—Posz Law Group, PLC

(57) ABSTRACT

A car navigation system changes from a normal guidance mode to a simplifying guidance mode when determining that part or all of sections in a guidance route is familiar or specific to an occupant. The simplifying guidance mode provides no audio guidance or simplified audio guidance with respect to route-related information compared to the normal guidance mode, while traffic-related information is provided using the same audio guidance as in the normal guidance mode.

44 Claims, 7 Drawing Sheets

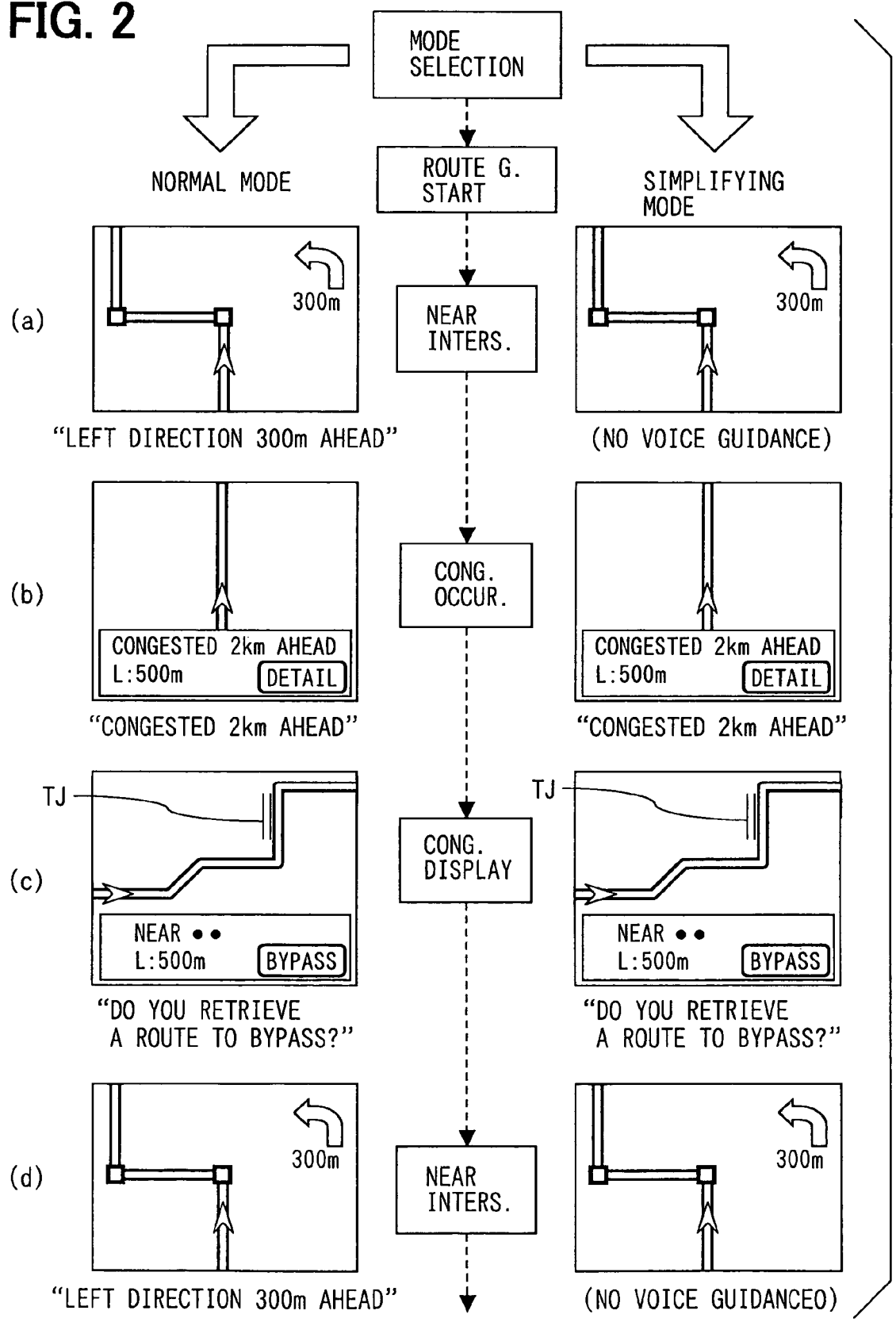

CAR NAVIGATION SYSTEM

CROSS REFERENCE TO RELATED APPLICATIONS

This application is based on and incorporates herein by reference Japanese Patent Applications No. 2004-280047 filed on September 27, and No. 2005-205970 filed on Jul. 14, 2005.

FIELD OF THE INVENTION

The present invention relates to a car navigation system.

BACKGROUND OF THE INVENTION

As described in patent document 1, for example, there is conventionally available a vehicle navigation system that displays traffic information about a road along a vehicle's traveling direction without using a route guidance function. This navigation system assumes that a road along the vehicle's traveling direction is a target road of which traffic information should be displayed. Accordingly, the navigation system cannot display traffic information about a road to a destination that does not belong to the road along the vehicle's traveling direction but is expected to be traveled by the vehicle.

By contrast, for example, a vehicle navigation system presented in patent document 2 sets an optimal route to a destination. When traffic congestion occurs on the optimal route, the vehicle navigation system displays traffic congestion information together with the optimal route. This makes it possible to display the traffic information about not only the road along the vehicle's traveling direction, but also the route that differs from this direction but is expected to be traveled by the vehicle up to the destination.

Patent document 1: JP2000-346664 A2
Patent document 2: JP-2785528 B2

The above-mentioned traffic information such as the traffic congestion information is so important for an occupant to influence the selection of roads to be traveled and needs to be definitely notified to the occupant. Accordingly, it is desirable to provide visually and audibly (i.e., using display guidance and audio guidance) the traffic information such as the traffic congestion information.

When the optimal route is targeted to a destination unfamiliar to the occupant, the occupant needs information such as intersections, junctions, and the like on the route to the destination. It is also desirable to visually and audibly provide the optimal route similarly to the traffic information.

In contrast, when the route is targeted to a destination familiar to the occupant, the occupant does not always need to be visually and audibly guided on the optimal route. In many cases, only a visual indication may be used to sufficiently confirm vehicle's traveling situations on the optimal route. When the optimal route is targeted to the destination familiar to the occupant, visually and audibly providing guidance on the optimal route may cause annoyance or uncomfortable feeling to the occupant.

SUMMARY OF THE INVENTION

The present invention has been made in consideration of the foregoing. It is therefore an object of the present invention to provide a car navigation system capable of allowing an occupant to be free from uncomfortable feeling even when a route guidance is performed for a destination via a route familiar to the occupant.

To achieve the above object, a car navigation system is provided with the following. A traffic-related information acquisition unit is included for acquiring traffic-related information about vehicular traffic. A setting unit is included for setting a destination. A route retrieval unit is included for retrieving a guidance route from a departure place to the set destination. A route guidance unit is included for providing (i) route-related information about the retrieved guidance route using display guidance and audio guidance, and (ii) traffic-related information along or near the retrieved guidance route using display guidance and audio guidance when the traffic-related information along or near the retrieved guidance route is acquired by the traffic-related information acquisition unit. A determination unit is included for determining whether or not part or all of sections in the retrieved guidance route is specific to an occupant. Furthermore, a route-related information editing unit is included for editing, of route-related information to be provided by the route guidance unit, route-related information about part or all of sections in the retrieved guidance route that is determined to be specific to the occupant. Here, the route guidance unit uses the edited route-related information to perform audio guidance for part or all of sections in the retrieved guidance route that is determined to be specific to the occupant.

In this manner, the edited route-related information is used to perform the audio guidance for part or all of the sections in the guidance route corresponding to the route specific to the occupant. It is possible to decrease troubles felt by the occupant compared to the audio guidance using the route-related information before the edit. As a result, the occupant can be free from uncomfortable feeling.

As another aspect of the present invention, a car navigation system is provided with the following. A traffic-related information acquisition unit is included for acquiring traffic-related information about vehicular traffic. A setting unit is included for setting a destination. A route retrieval unit is included for retrieving a guidance route from a departure place to the set destination. A route guidance unit is included for providing (i) route-related information about the retrieved guidance route using display guidance and audio guidance, and (ii) traffic-related information along or near the retrieved guidance route using display guidance and audio guidance when the traffic-related information along or near the retrieved guidance route is acquired by the traffic-related information acquisition unit. A determination unit is included for determining whether or not part or all of sections in the retrieved guidance route is specific to an occupant. Furthermore, a route-related information creating unit is included for creating route-related information about part or all of sections in the retrieved guidance route that is determined to be specific to the occupant. Here, the route guidance unit uses the created route-related information to perform audio guidance for part or all of sections in the retrieved guidance route that is determined to be specific to the occupant.

In this manner, the created route-related information is used to perform the audio guidance for part or all of the sections in the guidance route corresponding to the route specific to the occupant. It is possible to decrease troubles felt by the occupant compared to the audio guidance using the route-related information present before creating. As a result, the occupant can be free from uncomfortable feeling.

As yet another aspect of the present invention, a car navigation system is provided with the following. A traffic-related information acquisition unit is included for acquiring traffic-related information about vehicular traffic. A setting unit is included for setting a destination. A route retrieval unit is included for retrieving a guidance route from a departure place to the set destination. A route guidance unit is included for providing (i) route-related information about the retrieved guidance route, and (ii) traffic-related information along or near the retrieved guidance route when the traffic-related information along or near the retrieved guidance route is acquired by the traffic-related information acquisition unit. Furthermore, a guidance mode selection unit is included for selecting one of two guidance modes of a normal mode and an audio route guidance simplifying and omitting mode. Here, the normal mode provides traffic-related information and route-related information using both display guidance and audio guidance. In contrast, the audio route guidance simplifying and omitting mode provides (i) traffic-related information using both display guidance and audio guidance, and (ii) route-related information only using display guidance or using the display guidance and audio guidance that is simpler than the audio guidance used in the normal mode with respect to the route-related information. Further, the route guidance unit performs guidance according to a guidance mode selected by the guidance mode selection unit.

As mentioned above, the car navigation system according to the present invention is provided with a normal mode and an audio route guidance simplifying and omitting mode. The normal mode visually and audibly provides the traffic-related information and the route-related information. The audio route guidance simplifying and omitting mode provides the traffic-related information visually and audibly, but provides the route-related information only visually; alternatively, the audio route guidance simplifying and omitting mode performs audio guidance simpler than audio guidance for route-related information in the normal mode when providing the route-related information visually and audibly. The car navigation system is provided with a guidance mode selection unit for selecting one of these two guidance modes.

BRIEF DESCRIPTION OF THE DRAWINGS

The above and other objects, features, and advantages of the present invention will become more apparent from the following detailed description made with reference to the accompanying drawings. In the drawings:

FIG. 2 diagrams differences between a normal mode and an audio route guidance simplifying and omitting mode for a route guidance function according to a first embodiment;

DETAILED DESCRIPTION OF THE PREFERRED EMBODIMENTS

First Embodiment

Figure 1:
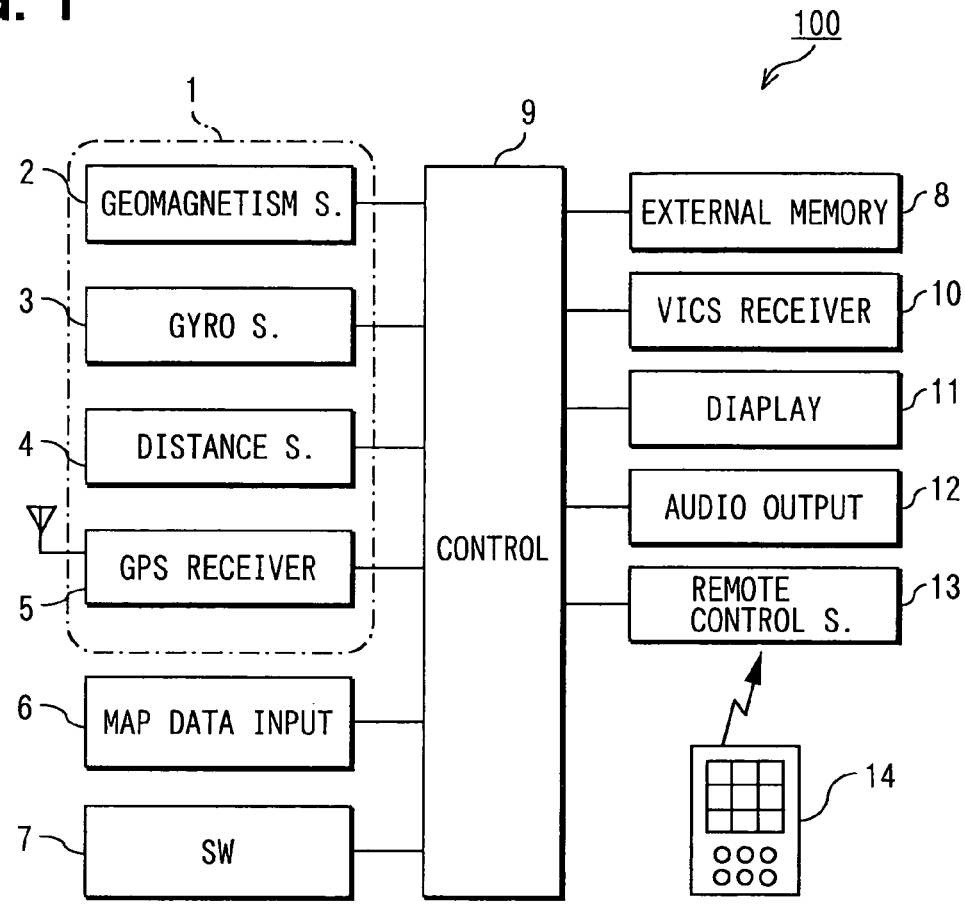
FIG. 1 is a block diagram schematically showing the configuration of a car navigation system 100.

FIG. 1 is a block diagram schematically showing the configuration of a car navigation system 100. As shown in FIG. 1, the car navigation system 100 includes a position detector 1, a map data input device 6, operation switches 7, an external memory 8, a control circuit 9, a VICS receiver 10, a display device 11, an audio output device 12, a remote control sensor 13, and a remote controller 14.

The control circuit 9 is an ordinary computer and internally contains a known CPU, ROM, RAM, I/O, and a bus line connecting these components. The ROM stores a program to be executed by the control circuit 9. According to this program, the CPU and the like perform specified operations.

The position detector 1 includes a geomagnetism sensor 2, a gyro sensor 3, a distance sensor 4, and a GPS receiver 5. The geomagnetism sensor 2 detects the bearing corresponding to a vehicle's traveling direction. The gyro sensor 3 detects an angular speed with reference to a vehicle's vertical direction. The distance sensor 4 detects a distance traveled by the vehicle. The GPS (Global Positioning System) receiver 5 detects a current vehicle position based on electric waves from satellites. These components have characteristically different errors and are therefore used so that they complement each other.

Depending on required sensor accuracies, the position detector 1 may choose part of the above-mentioned components. Further, although not shown, it may be preferable to use a steering rotation sensor, a vehicle speed sensor to detect speeds from rotational speeds of respective rolling wheels, and the like.

The map data input device 6 supplies map data composed of road data, a point retrieval information database (hereafter referred to as a point retrieval information DB), and the like. The map data is stored in writable storage media such as a memory card, a hard disk, and the like. The following describes link data and node data of road data constituting the map data.

Roads on a map are divided by multiple nodes such as points of intersection, fork, and junction. A link is defined between nodes. Links are connected to constitute a road. The link data is composed of a unique number (link ID) to specify a link, a link length to indicate the length of a link, coordinates (latitude and longitude) for start and end points of the link, a road name, a road type, a road width, and the number of lanes (traffic lanes).

The node data is composed of a node ID providing a unique number to a node for forking, merging, or intersecting roads on the map, node coordinates (latitude and longitude), a node name (e.g., intersection name), and a connection link ID to describe link IDs for all links connected to the node.

The point retrieval information DB is composed of index data and detail data used for facility retrieval. Retrieval data is provided for retrieval methods such as a name retrieval to retrieve a specific facility using the facility name as a retrieval key, a category retrieval to retrieve a specific facility using the facility category as a retrieval key, a surrounding facility retrieval to retrieve a specific facility using positions such as a current position as a retrieval key, and the like.

The index data stores information only needed for the retrieval methods. The detail data stores the other detailed information about facilities. Each index data stores an address of the detail data. The detail data can be referenced from the index data.

The detail data stores detailed data about a facility composed of a name, coordinates (latitude and longitude), an address, a telephone number, coordinate accuracy, and the like. The detail data is referenced from the index data according to a different retrieval method and is therefore constructed independently of retrieval methods.

The operation switches 7 use touch switches, mechanical switches, and the like integrated with the display device 11 to be described and are used for various input operations.

The external memory 8 includes a rewritable nonvolatile storage medium. The storage medium stores various databases such as a point registration information database (hereafter referred to as a point registration information DB), a history information database (hereafter referred to as a history information DB), a user-registered route database (hereafter referred to as a user-registered route DB), and a learned route database (hereafter referred to as a learned route DB). The point registration information DB stores information about facilities the occupant has retrieved using the point retrieval information DB. Specifically, the point registration information DB stores registration information such as retrieved facility names, coordinates (latitude and longitude), and the like. The user-registered route DB registers routes familiar to the occupant.

Figure 3:
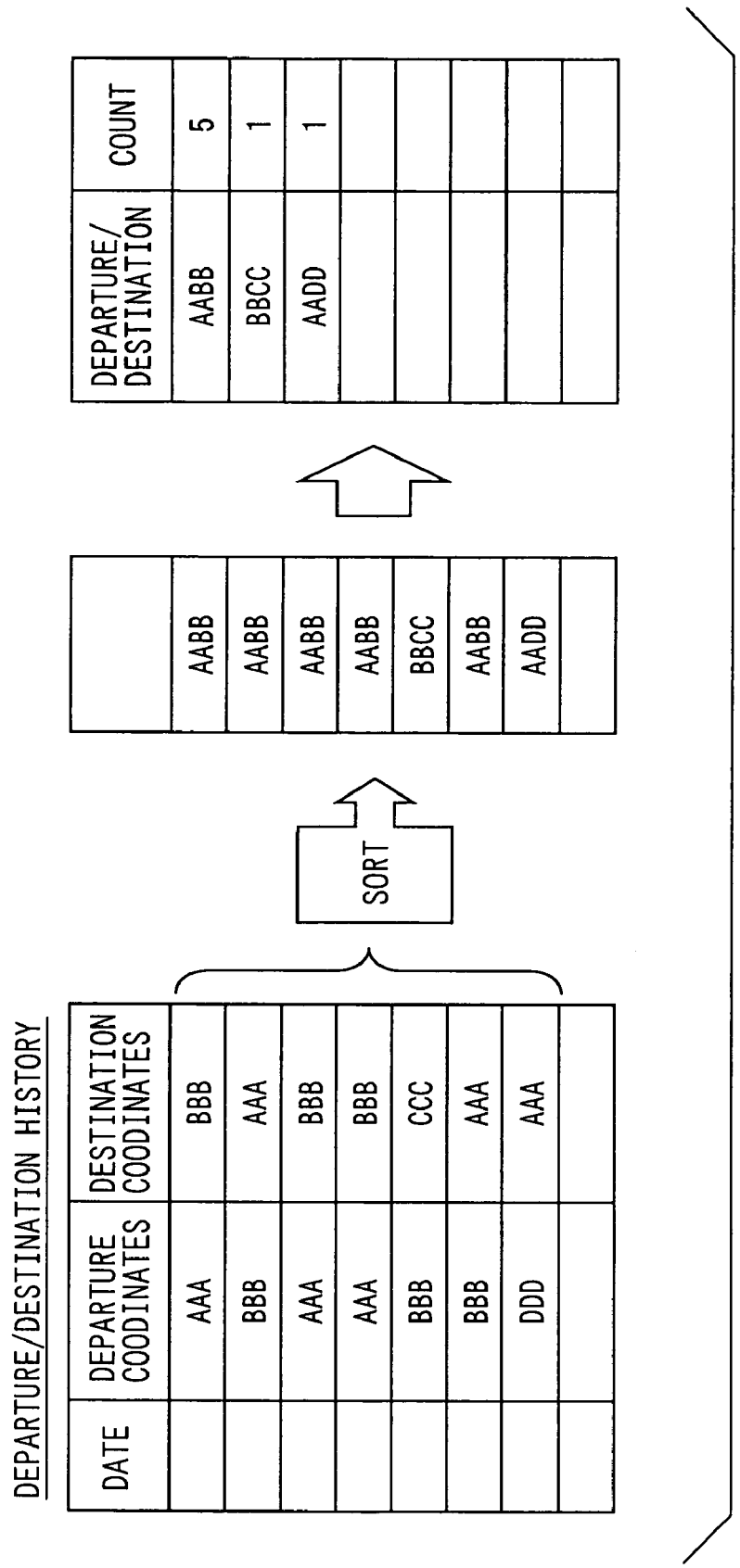
FIG. 3 diagrams history information about departure places and destinations.
Figure 4:
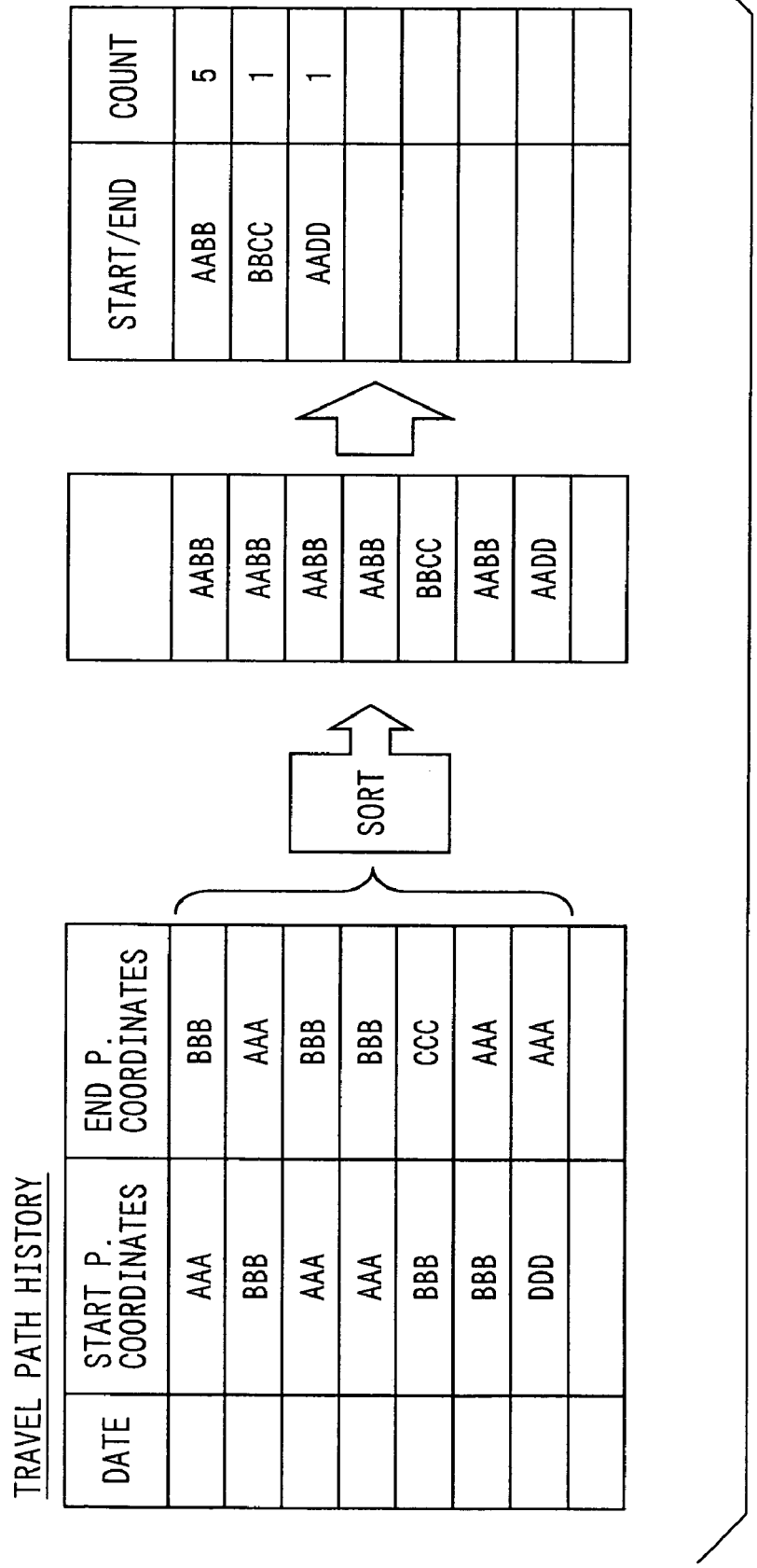
FIG. 4 diagrams history information about vehicular swept paths.

As shown in FIGS. 3 and 4, the history information DB stores history information obtained when the car navigation system 100 executed the route guidance function in the past. FIG. 3 shows the history information indicating the history of departure places and destinations of guidance routes. FIG. 4 shows the history information indicating the history of vehicle's travel paths or swept paths.

As shown in FIG. 3, the history information about departure places and destinations is composed of various types of data such as dates of performing the route guidance function in the past and coordinates (latitudes and longitudes) of departure places and destinations along the guidance routes. The history information is sorted (rearranged) in the ascending order of latitudes (or longitudes) of the departure places or the destinations. Detailed latitudes (or longitudes) are truncated from the data for latitudes (or longitudes) corresponding to departure places or destinations so as to include the same adjacent areas. As shown in FIG. 3, count numbers are given to summarize the history about the same departure place and destination.

As shown in FIG. 4, the history information about vehicular swept paths is composed of data for latitudes and longitudes corresponding to the start point and the end point for a vehicle's traveling trajectory (i.e., vehicular swept path or travel path) up to the vehicle's current position when the car navigation system 100 is operating. The history information is sorted in the ascending order of latitudes (or longitudes) of the start points or the end points. Detailed latitudes (or longitudes) are truncated from the data for latitudes (or longitudes) corresponding to start points or end points so as to include the same adjacent areas. As shown in FIG. 4, count numbers are given to summarize the history about the same start point and end point.

The VICS receiver 10 receives road traffic information (hereafter referred to as traffic-related information) distributed from the VICS (Vehicle Information and Communication System) center via beacons installed on roads and local FM broadcasting stations.

For example, the traffic-related information includes the place where the traffic congestion occurs, the traffic congested area length, the traffic congestion information composed of a traffic congestion level and a travel time (time needed for the travel) for each of links constituting the traffic congested area, and the traffic regulation information such as traffic closure due to accident or construction work and closure of entrances and exits for highways and the like. The traffic congestion level is represented by multiple evaluation grades (e.g., congested, crowded, uncrowded, and the like). The control circuit 9 processes the received traffic-related information. For example, the traffic congestion information and the traffic regulation information can be displayed overlapped with a map displayed on a screen of the display device 11.

For example, a communication apparatus (not shown) may be used for communicational connections with the outside of the vehicle to receive the traffic-related information including the road surface state information such as dry, wet, snowed, and frozen and the information about invisibility due to heavy rain or fog.

The display device 11 is composed of a liquid crystal display, for example. The display device 11 provides a screen capable of displaying a road map around the vehicle. The road map is composed of a vehicle position mark and map data. The vehicle position mark corresponds to the vehicle's current position supplied from the position detector 1. The map data is supplied from the map data input device 6. The audio output device 12 is composed of a speaker, an audio amplifier, and the like and is used for audio guidance (voice guidance or audio assist) and the like.

The car navigation system 100 determines the destination position according to the remote control sensor 13 via a remote control terminal (hereafter referred to as a remote controller) 14 or according to the operation switches 7. The car navigation system 10 automatically retrieves an optimum route from the current position (or the departure place designated by an occupant) to the destination. The car navigation system 10 also has a so-called route guidance function to provide route-related information such as intersections, forking points, and merging points for right or left turn on the retrieved guidance route, entry into a curved road, passing through a toll booth on a highway, and the like. There are known techniques for automatically retrieving optimum routes such as the Dijkstra algorithm.

When the vehicle reaches an intersection for right or left turn, for example, the route guidance function provides the audio guidance in accordance with a distance to the intersection. The audio guidance is provided as "turn to the left about 700 m ahead" approximately 700 m short of the intersection, "turn to the left about 300 m ahead" approximately 300 m short of the intersection, and "intersection reached, turn to the left" immediately before the intersection, for example. When the vehicle is going to enter a curved road, the audio guidance is provided as "curve ahead" near the entry into the curved road. When the vehicle passes through a highway's toll booth, the audio guidance is provided as "passing through the toll booth" near the entry or exit from the toll booth.

The traffic-related information may be received from the VICS receiver 10 during the route guidance. In such case, the route guidance function displays this traffic-related information on the display device 11 and provides the audio guidance for that information using the audio output device 12.

When traffic congestion occurs on the guidance route, for example, the route guidance function notifies visually and audibly (i.e., using display guidance and audio guidance) the place of traffic congestion occurrence (distance from the current position such as "congested 2 km ahead") and the traffic congested area length (traffic congestion length such as "500 m") as shown in (b) of FIG. 2. In this manner, an occupant can definitely recognize important information about a road to be selected for further traveling.

The car navigation system 100 is provided with not only the above-mentioned route guidance function, but also a route learning function. The route learning function learns a route frequently traveled by the vehicle based on the history information about vehicular swept paths in the history information DB. When the route learning function specifies a route to be learned, the route is stored as a learned route DB in the external memory 8. When the route guidance function retrieves a guidance route, the learned route DB is used to include the learned route in the guidance route. For example, an occupant may frequently travel familiar routes near his or her own home. The route learning function learns routes frequented by the occupant. The route guidance function retrieves the guidance route containing the learned routes. In this manner, the guidance route can include the routes frequented by the occupant. The route learning function is detailed in JP-H8-287972 A, for example, and a description is omitted.

The car navigation system 100 according to the embodiment has the above-mentioned construction and provides the route guidance function with two modes, i.e., normal mode and audio (or voice) route guidance simplifying and omitting mode. The normal mode guides, visually and audibly (i.e., using display guidance and audio guidance (or voice guidance)), the traffic-related information and the route-related information as mentioned above. The audio route guidance simplifying and omitting mode guides, visually and audibly (i.e., using display guidance and audio guidance), the traffic-related information and guides, only visually (i.e., using display guidance), the route-related information. Alternatively, when visually and audibly guiding the route-related information, the audio route guidance simplifying and omitting mode provides audio guidance simpler than the audio guidance for the route-related information in the normal mode.

Figure 5:
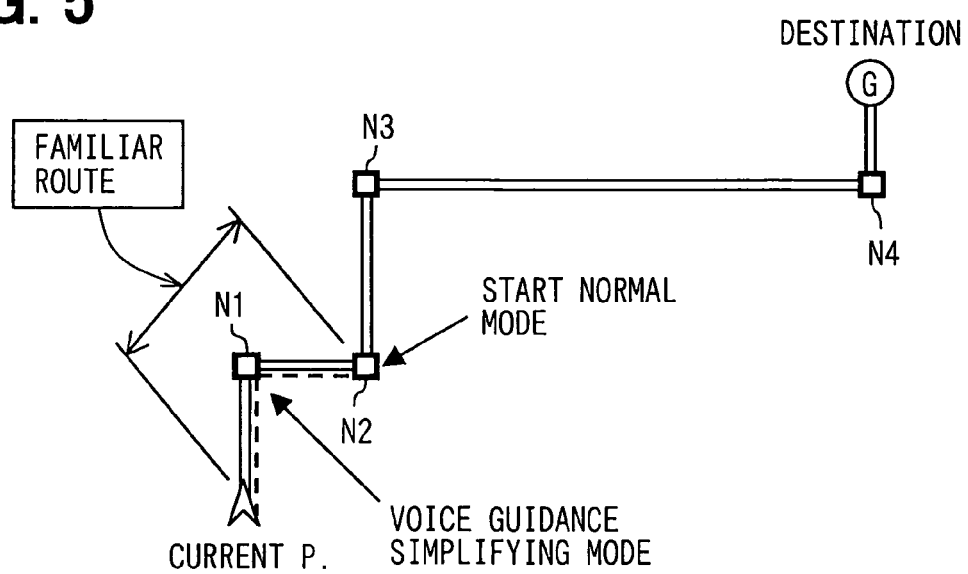
FIG. 5 diagrams selection of the audio route guidance simplifying and omitting mode as a guidance mode for a section that is familiar to an occupant and is included in a guidance route from a current plate (departure place) to a destination.

When the route guidance function retrieves a guidance route from the current place (departure place) to the destination as shown in FIG. 5, the car navigation system 100 determines whether or not part or all of the sections in the guidance route is familiar to the occupant based on the history information stored in the history information DB or routes to be learned for storing the learned route DB. As a result, it may be determined that part or all of the sections in the guidance route is familiar to the occupant. In this case, the car navigation system 100 selects the audio route guidance simplifying and omitting mode as the guidance mode for the part or all of the sections in the guidance route. The car navigation system 100 performs the guidance according to the selected guidance mode.

In FIG. 5, for example, a section from the current place (departure place) to point N1 and a section from point N1 to point N2 correspond to the history information or routes to be learned. The car navigation system 100 determines that the section from the current place (departure place) to point N2 is familiar to the occupant. The car navigation system 100 selects the audio (or voice) route guidance simplifying and omitting mode as the guidance mode for this section. The car navigation system 100 selects the normal mode as the guidance mode for the remaining section from point N2 to point N3, from point N3 to point N4, and from point N4 to the destination.

That is, the history information includes the history of departure places and destinations on the guidance route and the history of vehicular swept paths. When such history information is stored, the stored history information can be used to determine whether or not part or all of the sections in the guidance route is familiar to the occupant. The route learning function aims at learning routes familiar to the occupant (in other words, frequently traveled routes because the occupant often uses them). Determining whether or not the route is targeted for learning is useful to determine whether or not part or all of the sections in the guidance route is familiar to the occupant.

When part or all of the sections in the guidance route is familiar or specific to the occupant, it is a good practice to select the audio route guidance simplifying and omitting mode as the guidance mode for the relevant section. In such case, only the screen display is used to provide the route-related information about part or all of the sections in the guidance route corresponding to the route familiar to the occupant. Alternatively, a simplified audio guidance is performed as well as the screen display.

Figure 6:
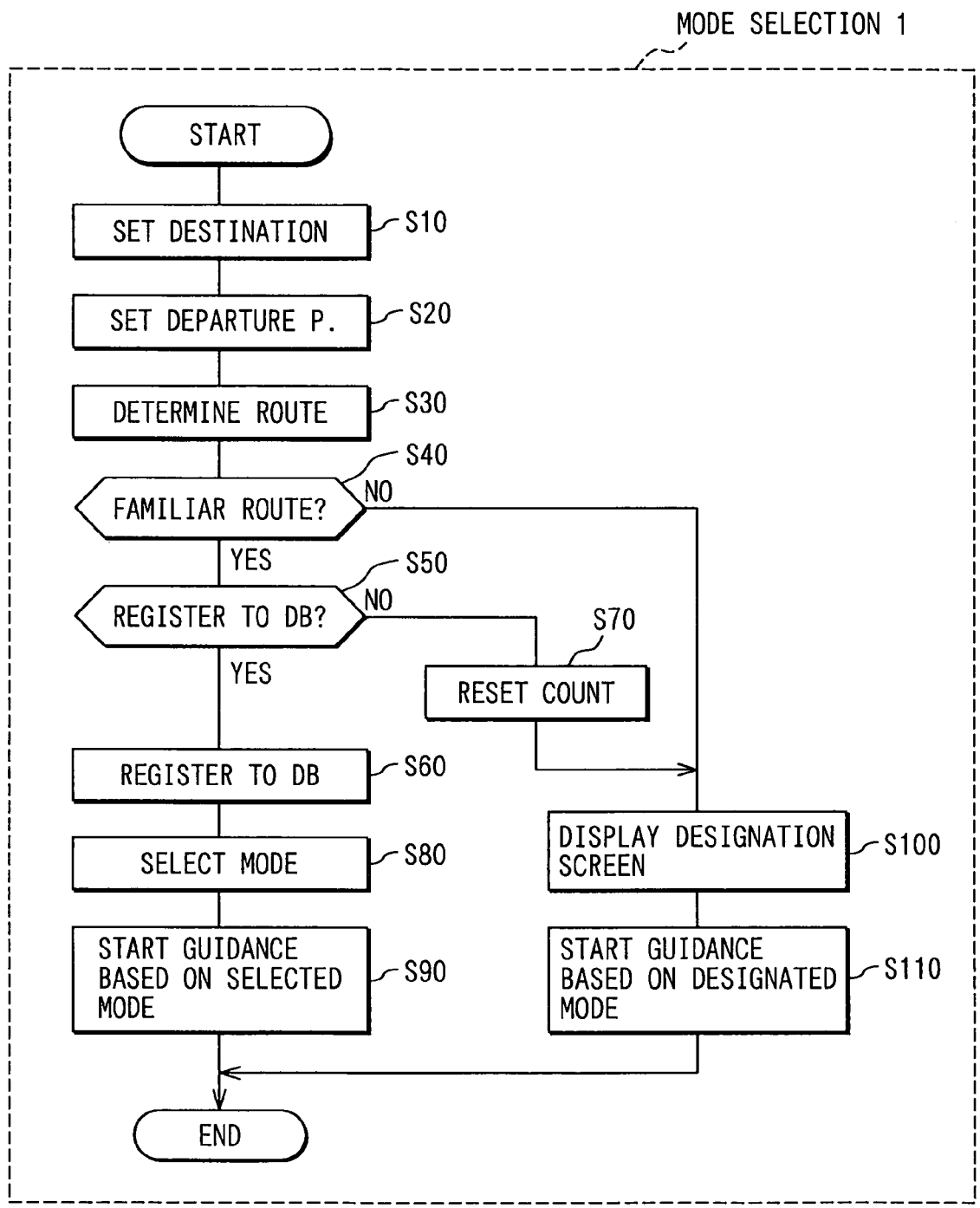
FIG. 6 is a flowchart showing a guidance mode selection process according to the first embodiment.

With reference to a flowchart in FIG. 6, the following describes a guidance mode selection process performed by the car navigation system 100 according to the first embodiment. At Step (hereafter abbreviated as S) 10 in FIG. 6, the process sets or specifies a destination using the point retrieval information DB and the point registration information DB. At S20, the process automatically sets or defines the current place as the departure place using GPS data and road data that are received by the GPS receiver 5 and indicate the vehicle's current position. In addition, an occupant may define any point as the departure place. At S30, the process retrieves a route from the departure place defined at S20 to the destination defined at S10. When multiple routes are retrieved, the process determines one guidance route to be provided for guidance.

At S40, the process uses the user-registered route DB, history information DB, and the learned route DB to determine whether or not part or all of the sections in the guidance route retrieved at S30 is a route familiar to the occupant and/or a user-registered route. When the determination result is affirmative, the process proceeds to S50. When the determination result is negative, the process proceeds to S100.

At S40, the process first uses the user-registered route DB to determine whether or not part or all of the sections in the guidance route is a user-registered route. That is, the user-registered route DB registers routes frequented by the occupant. When part or all of the sections in the guidance route is a user-registered route, it is possible to determine that the user-registered route is a route frequented by the occupant.

When part or all of the sections in the guidance route is targeted for learning, the process uses the learned route DB at S40 to determine that the section corresponds to the route frequented by the occupant. As mentioned above, the route learning function learns routes frequented by the occupant. Accordingly, when part or all of the sections in the guidance route is targeted for learning, it is possible to determine that the route targeted for learning is equivalent to the route frequented by the occupant.

There may be a case where the guidance route contains a departure place and a destination indicating the count greater than or equal to a specified value according to the history information about departure places and destinations. In such case, the process uses the history information at S40 to determine that the section from the departure place to the destination is the route frequented by the occupant. That is, when the history of the departure place and the destination on the guidance route indicates the count greater than or equal to a specified value, the departure place and the destination were repeatedly used for the guidance route in the past. It is assumed that the section from the departure place to the destination is the route frequented by the occupant. Accordingly, when the guidance route includes the departure place and the destination indicating the count greater than or equal to a specified value, it is possible to determine that the section from the departure place to the destination is the route frequented by the occupant.

Further, a vehicular swept path contained in the history information may show the count greater than or equal to a specified value and overlap with (or match) the guidance route. In such case, at S40, the process uses the history information DB to determine that the overlapping (matching) section is the route frequented by the occupant. That is, when the history of vehicular swept path between given points shows the count greater than or equal to a specified value, this signifies that the section between the points was repeatedly traveled. The section between the points is considered to be the route frequented by the occupant. Accordingly, when the vehicular swept path shows the count greater than or equal to a specified value and overlaps with (or matches) the guidance route, it is possible to determine that the overlapping (matching) section is the route frequented by the occupant.

At S40, the process uses the user-registered route DB and the history information DB for determination. It may be preferable to use only either database for determination. Further, at S40, the process uses the history information about departure places and destinations stored in the history information DB and the history information about vehicular swept paths. It may be preferable to use either history information for determination.

At S40, the process uses the history information DB to determine the section on the guidance route to be the route frequented by the occupant. At S50, the process prompts an occupant to perform an input operation for determining whether or not to register that section as the route frequented by the occupant in the user-registered route DB. When an input operation is performed for the registration, the process registers that section as a user-registered route DB at S60. When an input operation is performed to dismiss the registration at S50, the process resets the count (to zero) for the history information about the section at S70. When the section is a route targeted for learning or a user-registered route, control proceeds to S100 without the process at S70.

At S80, the process selects the audio route guidance simplifying and omitting mode as the guidance mode for part or all of the sections in the guidance route determined to be the route frequented by the occupant and/or user-registered route. When there is another section of the guidance route, the process selects the normal mode as the guidance mode for that section. At S90, the process starts the route guidance corresponding to the selected guidance mode.

At S40, the determination result may be negative. That is, part or all of the sections in the guidance route may be neither the route frequented by the occupant nor the user-registered route. In such case, at S100, the process allows the display device 11 to display a designation screen to designate the guidance mode for all sections in the guidance route. In this manner, the process prompts the occupant to designate one of the normal mode and the audio route guidance simplifying and omitting mode.

In this manner, it is possible to select the guidance mode designated by the occupant even when the section is not assumed to be the route frequented by the occupant as a result of the determination based on the specified count. As a result, it is possible to cover differences in occupant's degrees of recognizing routes though not covered by the determination based on the specified count.

When the determination is negative at S50, the process allows at S100 the display device 11 to display a selection screen to select the guidance mode for part or all sections in the guidance route that rejected the user registration as the frequented route. In this manner, the process prompts the occupant to designate one of the normal mode and the audio route guidance simplifying and omitting mode. When there is another section of the guidance route, the process selects the normal mode as the guidance mode for that section. At S110, the process starts the route guidance corresponding to the selected guidance mode designated at S100.

As mentioned above, the car navigation system according to the first embodiment is provided with two guidance modes, i.e., the normal mode and the audio route guidance simplifying and omitting mode and allows these modes to be selectable. The normal mode visually and audibly provides the traffic-related information and the route-related information. The audio route guidance simplifying and omitting mode visually and audibly provides the traffic-related information and only visually provides the route-related information. Alternatively, when the route-related information is provided visually and audibly, the audio route guidance simplifying and omitting mode provides audio guidance simpler than the audio guidance for the route-related information in the normal mode.

The car navigation system 100 selects the normal mode when traveling to the destination through a route unfamiliar to the occupant, for example. The car navigation system 100 performs the guidance in accordance with the normal mode. The normal mode visually and audibly provides the route-related information such as intersections and junctions and the traffic-related information on the guidance route. This makes it possible to definitely provide the occupant with necessary information.

In contrast, the car navigation system 100 selects the audio route guidance simplifying and omitting mode when traveling to the destination through the route frequented by the occupant. The car navigation system 100 performs the guidance in accordance with the audio route guidance simplifying and omitting mode. This mode only visually provides the route-related information such as intersections and junctions on the guidance route. Alternatively, the mode provides the visual guidance and performs a simplified audio guidance. Consequently, the occupant can visually confirm the vehicle's traveling situations and can be free from uncomfortable feeling.

The following describes differences between the normal mode and the audio route guidance simplifying and omitting mode in terms of the route guidance function. The audio route guidance simplifying and omitting mode visually and audibly provides the traffic-related information and only visually provides the route-related information. When the route-related information is provided visually and audibly, the audio route guidance simplifying and omitting mode performs audio guidance simpler than the audio guidance for the route-related information in the normal mode. The audio route guidance simplifying and omitting mode may necessitate selection whether to only visually provide the route-related information (to omit the audio guidance) (as a first manner) or to perform simplified audio guidance (as a second manner). For example, the occupant may be responsible for the selection of the first and second manners when the audio route guidance simplifying and omitting mode is selected as the guidance mode. Alternatively, either the first manner or the second manner may be predetermined by default and the occupant may change the default as needed.

For example, a simplified audio guidance can be performed by setting its count or frequency to be smaller than that of audio guidance for the route-related information in the normal mode. When the vehicle approaches an intersection for right or left turn, for example, the normal mode performs audio guidance such as "turn to the left about 700 m ahead" approximately 700 m short of the intersection, "turn to the left about 300 m ahead" approximately 300 m short of the intersection, and "intersection reached, turn to the left" immediately before the intersection. In such case, the audio guidance may be configured to be performed only once approximately 300 m short of the intersection. This makes it possible to perform the audio guidance having a relatively small count.

For example, it may be preferable to omit less important part of audio guidance for the route-related information in the normal mode and perform an simplified audio guidance. When the vehicle is going to enter a curved road, for example, the normal mode performs the audio guidance such as "curve ahead" near the entry into the curved road. When the vehicle passes through a highway's toll booth, the normal mode performs the audio guidance such as "passing through the toll booth" near the entry or exit from the toll booth. These less important types of audio guidance are omitted. The audio guidance is performed for the traveling direction only at a point for right or left turn. This makes it possible to perform only the relatively highly important audio guidance.

In addition, a simplified audio guidance may be performed by shortening the description of the audio guidance for the route-related information in the normal mode. When the normal mode performs the audio guidance such as "turn to the left about 700 m ahead," for example, the description of the audio guidance may be shortened to "left 700 m ahead" or the like. In this manner, selecting the audio route guidance simplifying and omitting mode can perform the audio guidance having the sentence simpler than that of the audio guidance for the route-related information in the normal mode when selected.

With reference to (a) and (b) of FIG. 2, the following describes a specific example of the normal mode and the audio route guidance simplifying and omitting mode. FIG. 2 shows, in (a) and (b), a case where the audio guidance is omitted from the audio route guidance simplifying and omitting mode. As mentioned above, the guidance mode selection process selects the guidance mode to start the route guidance. When the vehicle approaches the vicinity of an intersection to turn to the left as shown in (a) of FIG. 2, the normal mode visually and audibly provides the route-related information (left direction 300 m ahead) about the guidance route. The audio route guidance simplifying and omitting mode only visually provides the route-related information about the guidance route (without audio route guidance).

FIG. 2 shows, in (b), that the traffic congestion occurs on (and/or near) the guidance route. In this case, the normal mode and the audio route guidance simplifying and omitting mode visually and audibly notify the place of traffic congestion occurrence (distance from the current position such as "congested 2 km ahead") and the traffic congested area length (traffic congestion length such as "500 m"). In this manner, the occupant can definitely recognize the important information when selecting a route to be traveled.

As shown in (b) of FIG. 2, the car navigation system 100 displays not only the place of traffic congestion occurrence and the traffic congested area length, but also a "DETAIL" icon to display a detailed map near the place of traffic congestion occurrence. When the "DETAIL" icon is activated from the remote controller 14 or the operation switches 7, the screen display provides the detailed map near the place of traffic congestion occurrence. In this manner, the occupant can determine whether or not to bypass the traffic congested area based on the screen display. As shown in (c) of FIG. 2, it may be preferable to display the traffic congested area (TJ) along the route and change display modes of the traffic congested area (TJ) according to traffic congestion levels.

As shown in (c) of FIG. 2, the car navigation system 100 visually provides the detailed map near the place of traffic congestion occurrence. In addition, the car navigation system 100 visually and audibly provides guidance ("do you retrieve a route to bypass the congestion?") concerning the retrieval of a bypass route to the destination so as to bypass the traffic congested area. This makes it possible to definitely prompt the occupant to retrieve a bypass route.

After the guidance concerning the bypass route retrieval, the occupant can operate the remote controller 14 or the operation switches 7 to activate a "BYPASS" icon to start retrieving the bypass route as shown in (c) of FIG. 2. In this manner, the bypass route can be retrieved.

FIG. 2 shows, in (d), that the vehicle approaches the vicinity of an intersection to turn to the left. The normal mode visually and audibly provides the route guidance (left direction 300 m ahead). The audio route guidance simplifying and omitting mode only visually provides the route guidance (no audio route guidance). In this manner, the occupant can start the retrieval of a bypass route and can be provided with the guidance about the retrieved bypass route.

(Modification 1)

The guidance mode setup process in the car navigation system 100 according to the embodiment selects the guidance mode according to a result of determination whether part or all of the sections in the guidance route is a route frequented by the occupant and/or a user-registered route. Further, it may be preferable to allow the occupant to designate the guidance mode and provide the guidance according to the designated guidance mode.

For example, a guidance route from the current place to the destination in FIG. 5 is divided into multiple sections at points N1 through N4 for right or left turn on the guidance route. The occupant is allowed to designate the guidance mode for each of the divided sections. This enables the occupant to independently determine whether or not part or all of the sections in the guidance route is familiar to the occupant. The occupant can independently designate the guidance mode. As a result, it is possible to perform the guidance in accordance with the guidance mode designated by the occupant.

(Modification 2)

When the traffic congestion occurs on the guidance route, the embodiment provides the guidance concerning the retrieval of a bypass route to the destination by bypassing the traffic congestion. When the retrieval of a bypass route is designated, the embodiment retrieves a bypass route. Furthermore, even when the occupant intentionally diverges from the guidance route, it may be preferable to visually and audibly provides guidance prompting the occupant to reretrieve the guidance route. When the guidance route is reretrieved, the route guidance function may be performed for the reretrieved guidance route. In this case, it may be preferable to perform the guidance mode selection process at S40 and the subsequent steps in FIG. 6 for the reretrieved guidance route. This makes it possible to select the guidance mode for the reretrieved guidance route.

Second Embodiment

The second and first embodiments have many points in common. The following omits a detailed description about the common points and chiefly describes differences. The route guidance function of the car navigation system 100 according to the first embodiment is assigned two guidance modes, i.e., the normal mode and the audio route guidance simplifying and omitting mode. The route guidance function selects either guidance mode and performs the guidance according to the selected guidance mode.

The route guidance function according to the second embodiment does not predetermine the guidance mode and differs from the first embodiment as follows. It is determined that part or all of the sections in the retrieved guidance route is the route frequented by the occupant and/or the user-registered route. Of the route-related information about the guidance route, certain route-related information is edited that is associated with part or all of the sections in the guidance route corresponding to the route frequented by the occupant and/or the user-registered route. This edited certain route-related information is used for the audio guidance concerning the relevant section.

That is, part or all of the sections in the retrieved guidance route may be determined to be neither the route frequented by the occupant nor the user-registered route. In such case, the route guidance function performs the route guidance similar to that in the normal mode as described in the first embodiment. (The route guidance function visually and audibly performs the route guidance for the route-related information associated with the guidance route.) In contrast, part or all of the sections in the retrieved guidance route may be determined to be the route frequented by the occupant and/or the user-registered route. Here, the route guidance function performs the visual route guidance similar to that in the normal mode as described in the first embodiment. With respect to the audio guidance, the route guidance function edits the route-related information to be used for the audio guidance associated with the relevant section. The route guidance function uses the edited route-related information to performs the audio guidance.

Figure 7:
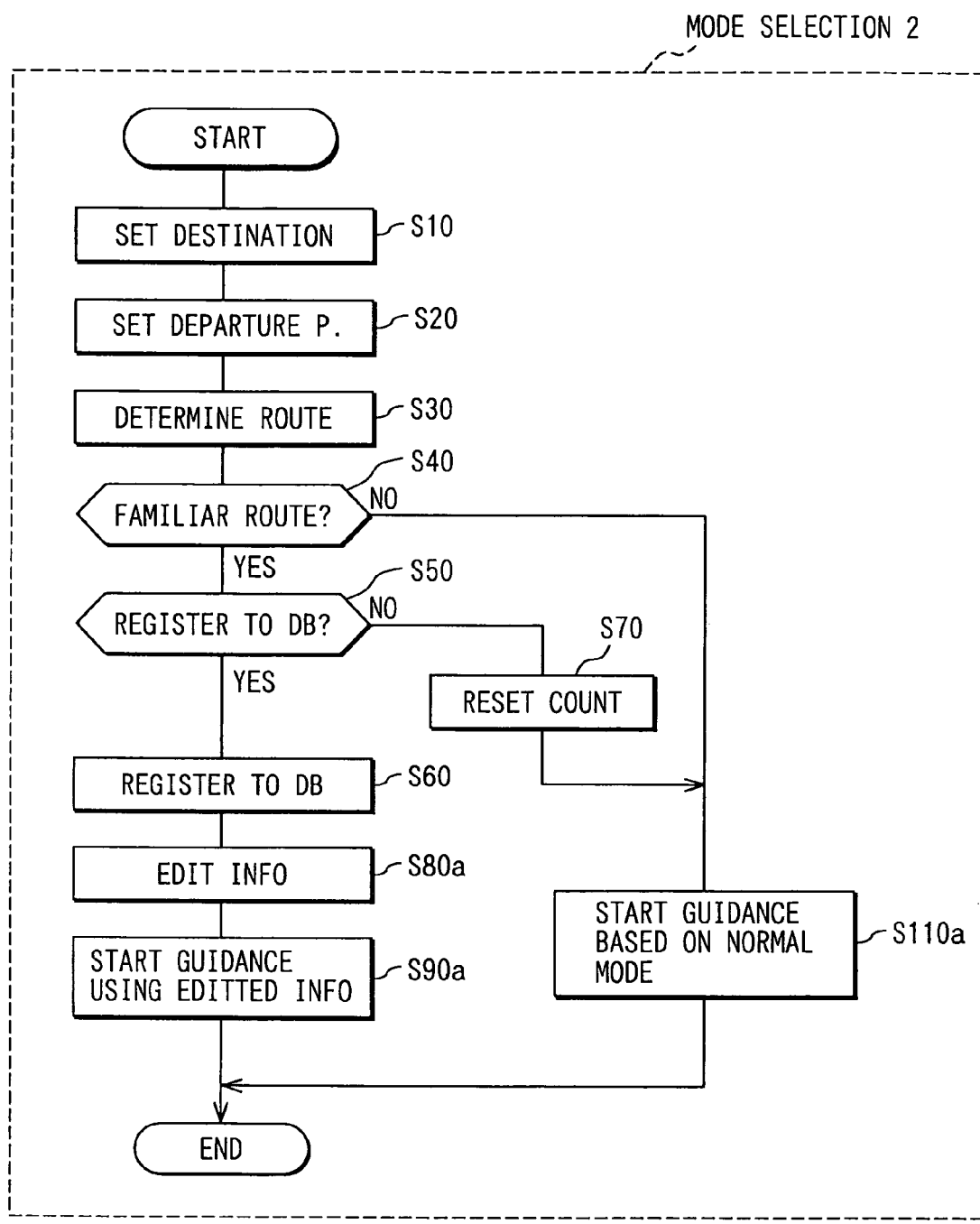
FIG. 7 is a flowchart showing a guidance mode selection process according to a second embodiment.

The following describes the guidance mode selection process for the car navigation system 100 according to the second embodiment with reference to a flowchart in FIG. 7. The process from S10 to S70 in FIG. 7 is the same as that in the first embodiment and a description is omitted.

At S80a, the process edits the route-related information concerning part or all of the sections in the guidance route determined to be the route frequented by the occupant and/or the user-registered route. The edit at S80a is based on the route-related information in the normal mode described in the first embodiment. For example, the route-related information is edited so as to omit the audio guidance for part or all of the sections in the guidance route corresponding to the route frequented by the occupant. Alternatively, the route-related information is edited so as to perform audio guidance simpler than the audio guidance that uses the route-related information before the edit.

When the route-related information is edited so as to omit the audio guidance for the section, the route-related information is only visually provided for that section. When the route-related information is edited so as to perform the simplified audio guidance for the section, the simplified audio guidance is performed for that section. As a result, the occupant can be free from the audio guidance that may be annoying.

There may be several solutions for performing the simplified audio guidance. For example, one solution is to edit the route-related information so that the number of audio guidance occurrences becomes smaller than that for the route-related information before the edit. Another is to edit the route-related information so as to omit a less important audio guidance for the route-related information before the edit. Yet another is to edit the route-related information so as to simplify the content of the audio guidance for the route-related information before the edit. In this manner, it is possible to relatively decrease the number of audio guidance occurrences for the route-related information. It is possible to provide only a relatively more important audio guidance for the route-related information. It is possible to simplify the content of the audio guidance for the route-related information.

At S90a, the process uses the route-related information edited at S80a to perform the audio guidance for part or all of the sections in the guidance route determined to be the route frequented by the occupant and/or the user-registered route. For the other sections, the process uses the route-related information before the edit to perform the audio guidance.

At S40, the determination result may be negative. That is, part or all of the sections in the guidance route may be neither the route frequented by the occupant nor the user-registered route. In such case, at S100a, the process starts the normal route guidance similar to that in the normal mode as described in the first embodiment.

In this manner, the car navigation system 100 according to the second embodiment edits the route-related information about the guidance route as follows when part or all of the sections in the guidance route is determined to be the route frequented by the occupant and/or the user-registered route. That is, the car navigation system 100 edits the route-related information concerning part or all of the sections in the guidance route determined to be the route frequented by the occupant and/or the user-registered route. The edited route-related information is used to perform the audio guidance for the section.

In this manner, the edited route-related information is used to perform the audio guidance for part or all of the sections in the guidance route corresponding to the route frequented by the occupant. It is possible to decrease troubles felt by the occupant compared to the audio guidance using the route-related information before the edit. As a result, the occupant can be free from uncomfortable feeling.

Third Embodiment

The third and second embodiments have many points in common. The following omits a detailed description about the common points and chiefly describes differences. Let us assume that it is determined that part or all of the sections in the retrieved guidance route is the route frequented by the occupant and/or the user-registered route. Certain route-related information of the route-related information about the guidance route is associated with part or all of the sections in the guidance route corresponding to the route frequented by the occupant and/or the user-registered route. The route guidance function of the car navigation system 100 according to the second embodiment edits this certain route-related information and uses the edited route-related information for the audio guidance concerning the relevant section.

The route guidance function of the third embodiment differs from that of the second embodiment as follows. When part or all of the sections in the retrieved guidance route is determined to be the route frequented by the occupant and/or the user-registered route, the route guidance function newly creates route-related information concerning the section. The route guidance function uses the newly created route-related information to perform the audio guidance for the section.

Figure 8:
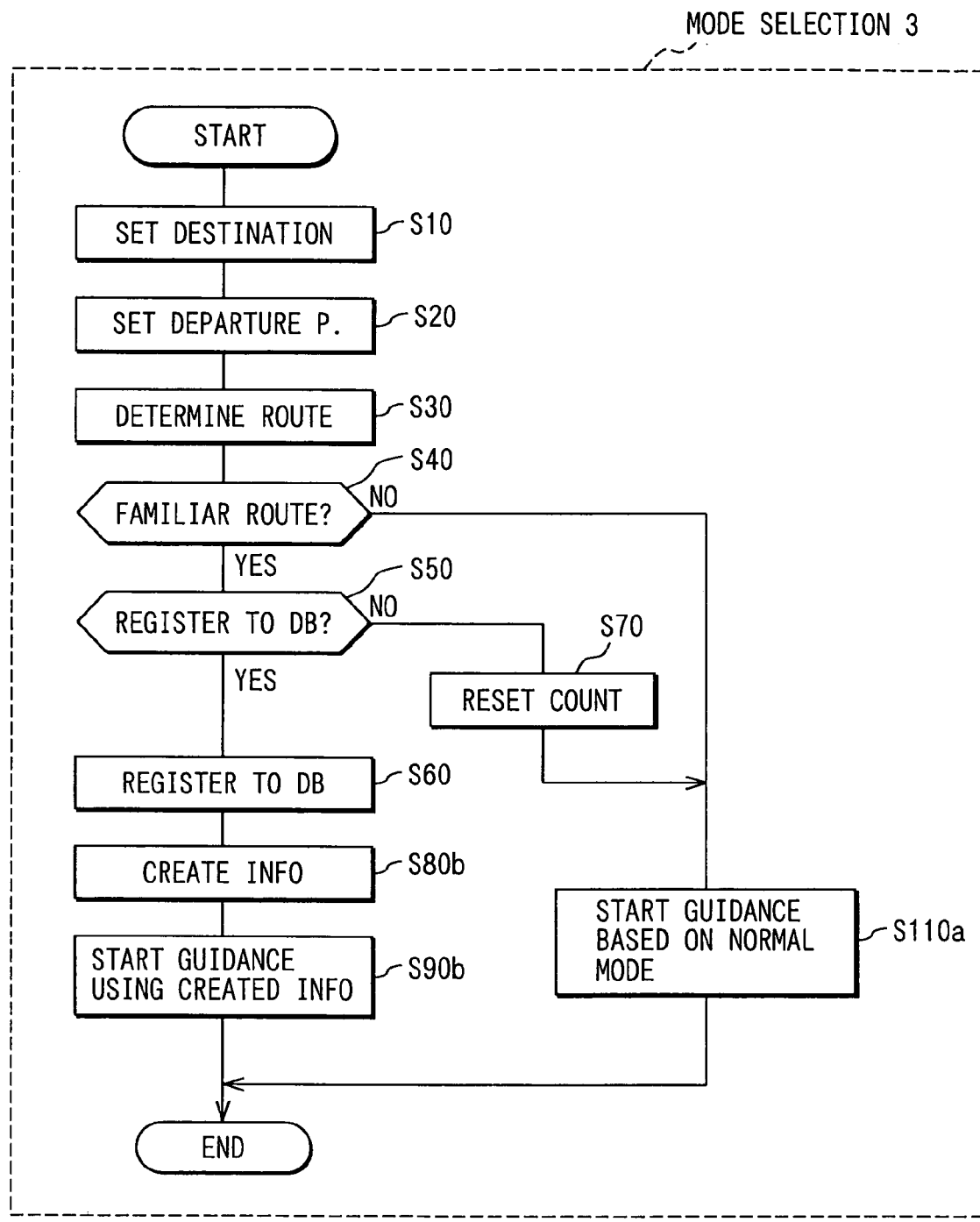
FIG. 8 is a flowchart showing a guidance mode selection process according to a third embodiment.

The following describes the guidance mode selection process for the car navigation system 100 according to the third embodiment with reference to a flowchart in FIG. 8. The process from S10 to S70 in FIG. 8 and at S100a is the same as that in the second embodiment and a description is omitted.

At S80b, the process newly creates route-related information concerning part or all of the sections in the guidance route determined to be the route frequented by the occupant and/or the user-registered route. At S80b, the process newly creates route-related information based on road data (link data and node data) about roads constituting the guidance route, for example. The new route-related information is created so as to perform audio guidance simpler than the audio guidance using the normal route-related information. This makes it possible to perform the simplified audio guidance for the relevant section. As a result, the occupant will have a decreased chance of feeling the audio guidance annoying.

There may be several solutions for performing the simplified audio guidance. For example, one solution is to create the route-related information so that the number of audio guidance occurrences becomes smaller than that for the route-related information before newly creating the information. Another is to create the route-related information so as to perform a more important audio guidance. Yet another is to create the route-related information so as to have the simpler content than that of the route-related information before newly creating the information. In this manner, it is possible to relatively decrease the number of audio guidance occurrences for the route-related information. It is possible to provide only a relatively more important audio guidance for the route-related information. It is possible to simplify the sentence of the audio guidance for the route-related information.

At S90b, the process uses the route-related information newly created at S80b to perform the audio guidance for part or all of the sections in the guidance route determined to be the route frequented by the occupant and/or the user-registered route. For the other sections, the process uses the route-related information before newly creating the information.

As mentioned above, part or all of the sections in the retrieved guidance route may be determined to be the route frequented by the occupant and/or the user-registered route. In such case, the car navigation system 100 according to the embodiment newly creates route-related information concerning the route-related information about part or all of the sections in the guidance route corresponding to the route frequented by the occupant and/or the user-registered route. The car navigation system 100 uses the newly created route-related information to perform the audio guidance for the section.

In this manner, the newly created route-related information is used to perform the audio guidance for part or all of the sections in the guidance route corresponding to the route frequented by the occupant. It is possible to decrease troubles felt by the occupant compared to the audio guidance using the route-related information previous to the newly created one. As a result, the occupant can be free from uncomfortable feeling.

In the above-mentioned embodiments, there has been described that the user-registered route DB registers the route frequented by the occupant. The user-registered route DB is not limited to registering this route.

For example, the occupant may select any route and register the selected route to the user-registered route DB. The occupant can select to register a road that connects between two specific intersections, for example.

In this case, it is a good practice to adjust a cost of the route registered by the occupant to the user-registered route DB to be lower than costs of the other roads. In this manner, this increases a possibility of including the occupant-registered route in routes to the predetermined destination during retrieval of the routes. The cost signifies data supplied to the link data in the map data to be used for route retrieval according to the Dijkstra algorithm, for example.

Similarly to the above-mentioned embodiments, it may be preferable to notify the occupant of the guidance for traveling at least on the occupant-registered route differently from the normal traveling guidance. This also makes it possible to provide the effects similarly to those described in the above-mentioned embodiments.

As mentioned above, the present invention can enable the user-registered route DB to register occupant-specific routes such as a route frequented by the occupant and a route selected and registered by the occupant.

A process may be executed using a CPU and the like included in the control circuit 9 of the car navigation system 100. Here, steps included in the process may be constructed as means or units in programs stored in the ROM of the control circuit 9.

It will be obvious to those skilled in the art that various changes may be made in the above-described embodiments of the present invention. However, the scope of the present invention should be determined by the following claims.

What is claimed is:

1. A car navigation system provided in a vehicle, the car navigation system comprising:
   a traffic-related information acquisition unit for acquiring traffic-related information about vehicular traffic;
   a setting unit for setting a destination;
   a route retrieval unit for retrieving a guidance route from a departure place to the set destination;
   a route guidance unit for providing (i) route-related information about the retrieved guidance route using display guidance and audio guidance, and (ii) traffic-related information about the retrieved guidance route using display guidance and audio guidance when the traffic-related information about the retrieved guidance route is acquired by the traffic-related information acquisition unit;
   a determination unit for determining whether or not part or all of sections in the retrieved guidance route is specific to an occupant of the vehicle; and
   a route-related information editing unit for editing, of route-related information to be provided by the route guidance unit, route-related information about part or all of sections in the retrieved guidance route that is determined to be specific to the occupant,
   wherein the route guidance unit uses the edited route-related information to perform audio guidance for part or all of sections in the retrieved guidance route that is determined to be specific to the occupant.

2. The car navigation system according to claim 1, wherein the route-related information editing unit edits route-related information so as to omit audio guidance for part or all of sections in the retrieved guidance route that is determined to be specific to the occupant.

3. The car navigation system according to claim 1, wherein the route-related information editing unit edits route-related information so as to perform audio guidance simpler than audio guidance using route-related information before editing.

4. The car navigation system according to claim 3, wherein the route-related information editing unit edits route-related information so as to make an occurrence frequency of audio guidance smaller than an occurrence frequency of audio guidance using route-related information before editing.

5. The car navigation system according to claim 3, wherein the route-related information editing unit edits route-related information so as to omit a less important part of audio guidance using route-related information before editing.

6. The car navigation system according to claim 3, wherein the route-related information editing unit edits route-related information so as to simplify a sentence of the audio guidance using route-related information before editing.

7. The car navigation system according to claim 1, further comprising:
a history information storage unit for storing history information containing at least one of (i) a history about a departure place and a destination of a guidance route and (ii) a history about a vehicular swept path,
wherein the determination unit functions based on the stored history information.

8. The car navigation system according to claim 7, wherein, when the retrieved guidance route includes a departure place and a destination indicating a count greater than or equal to a specified value, the determination unit determines that a section from the departure place to the destination is a route specific to or frequented by the occupant.

9. The car navigation system according to claim 7, wherein, when a vehicular swept path indicating a count greater than or equal to a specified value overlaps with the retrieved guidance route, the determination unit determines that an overlapping section is a route specific to or frequented by the occupant.

10. The car navigation system according to claim 7, further comprising:
a route learning unit for learning a route frequently traveled by the vehicle based on the history about a vehicular swept path,
wherein, when part or all of sections in the retrieved guidance route corresponds to a route for learning by the route learning unit, the determination unit determines that the route for learning is a route specific to or frequented by the occupant.

11. The car navigation system according to claim 1, wherein, when traffic congestion information is acquired as the traffic-related information, the route guidance unit notifies at least a place of traffic congestion occurrence and a length of a traffic congested area.

12. The car navigation system according to claim 11, further comprising:

a detail map display designation unit for designating display of a detail map for the place of traffic congestion occurrence and its vicinity; and
a detail map display control unit for controlling display of the detail map when receiving an instruction from the detail map display designation unit.

13. The car navigation system according to claim 11, further comprising:
a bypass route retrieval designation unit for designating retrieval of a bypass route to bypass the traffic congested area,
wherein the route guidance unit uses display guidance and audio guidance, with respect to retrieval of the bypass route,
wherein the route retrieval unit retrieves the bypass route when the bypass route retrieval designation unit designates retrieval of the bypass route after display guidance and audio guidance about retrieval of the bypass route, and
wherein the route guidance unit uses display guidance and audio guidance about the bypass route.

14. The car navigation system according to claim 1, wherein a route specific to the occupant signifies a route frequented by the occupant or a route pre-registered by the occupant.

15. A car navigation system provided in a vehicle, the car navigation system comprising:
a traffic-related information acquisition unit for acquiring traffic-related information about vehicular traffic;
a setting unit for setting a destination;
a route retrieval unit for retrieving a guidance route from a departure place to the set destination;
a route guidance unit for providing (i) route-related information about the retrieved guidance route using display guidance and audio guidance, and (ii) traffic-related information about the retrieved guidance route using display guidance and audio guidance when the traffic-related information about the retrieved guidance route is acquired by the traffic-related information acquisition unit;
a determination unit for determining whether or not part or all of sections in the retrieved guidance route is specific to an occupant of the vehicle; and
a route-related information creating unit for creating route-related information about part or all of sections in the retrieved guidance route that is determined to be specific to the occupant,
wherein the route guidance unit uses the created route-related information to perform audio guidance for part or all of sections in the retrieved guidance route that is determined to be specific to the occupant.

16. The car navigation system according to claim 15, wherein the route-related information creating unit creates route-related information so as to perform audio guidance simpler than audio guidance using route-related information present before creating.

17. The car navigation system according to claim 16, wherein the route-related information creating unit creates route-related information so as to make an occurrence frequency of audio guidance smaller than an occurrence frequency of audio guidance using route-related information present before creating.

18. The car navigation system according to claim 16, wherein the route-related information creating unit creates route-related information so as to perform audio guidance high in a level of importance.

19. The car navigation system according to claim 16,
wherein the route-related information creating unit creates route-related information so that audio guidance using the created route-related information is simpler than audio guidance using route-related information present before creating.

20. The car navigation system according to claim 15, further comprising:
a history information storage unit for storing history information containing at least one of (i) a history about a departure place and a destination of a guidance route and (ii) a history about a vehicular swept path,
wherein the determination unit functions based on the stored history information.

21. The car navigation system according to claim 20,
wherein, when the retrieved guidance route includes a departure place and a destination indicating a count greater than or equal to a specified value, the determination unit determines that a section from the departure place to the destination is a route specific to or frequented by the occupant.

22. The car navigation system according to claim 20,
wherein, when a vehicular swept path indicating a count greater than or equal to a specified value overlaps with the retrieved guidance route, the determination unit determines that an overlapping section is a route specific to or frequented by the occupant.

23. The car navigation system according to claim 20, further comprising:
a route learning unit for learning a route frequently traveled by the vehicle based on the history about a vehicular swept path,
wherein, when part or all of sections in the retrieved guidance route corresponds to a route for learning by the route learning unit, the determination unit determines that the route for learning is a route specific to or frequented by the occupant.

24. The car navigation system according to claim 15,
wherein, when traffic congestion information is acquired as the traffic-related information, the route guidance unit notifies at least a place of traffic congestion occurrence and a length of a traffic congested area.

25. The car navigation system according to claim 24, further comprising:
a detail map display designation unit for designating display of a detail map for the place of traffic congestion occurrence and its vicinity; and
a detail map display control unit for controlling display of the detail map when receiving an instruction from the detail map display designation unit.

26. The car navigation system according to claim 24, further comprising:
a bypass route retrieval designation unit for designating retrieval of a bypass route to bypass the traffic congested area,
wherein the route guidance unit uses display guidance and audio guidance, with respect to retrieval of the bypass route,
wherein the route retrieval unit retrieves the bypass route when the bypass route retrieval designation unit designates retrieval of the bypass route after display guidance and audio guidance about retrieval of the bypass route, and
wherein the route guidance unit uses display guidance and audio guidance about the bypass route.

27. The car navigation system according to claim 15,
wherein a route specific to the occupant signifies a route frequented by the occupant or a route pre-registered by the occupant.

28. A car navigation system provided in a vehicle, the car navigation system comprising:
a traffic-related information acquisition unit for acquiring traffic-related information about vehicular traffic;
a setting unit for setting a destination;
a route retrieval unit for retrieving a guidance route from a departure place to the set destination;
a route guidance unit for providing (i) route-related information about the retrieved guidance route, and (ii) traffic-related information about the retrieved guidance route when the traffic-related information about the retrieved guidance route is acquired by the traffic-related information acquisition unit; and
a guidance mode selection unit for selecting one of two guidance modes of a normal mode and an audio route guidance simplifying and omitting mode,
wherein the normal mode provides both traffic-related information and route-related information using both display guidance and audio guidance, and
wherein the audio route guidance simplifying and omitting mode provides
(i) traffic-related information using both display guidance and audio guidance, and
(ii) route-related information only using display guidance or using the display guidance and audio guidance that is simpler than the audio guidance used in the normal mode with respect to the route-related information, and
wherein the route guidance unit performs guidance according to a guidance mode selected by the guidance mode selection unit.

29. The car navigation system according to claim 28, further comprising:
a history information storage unit for storing history information containing at least one of (i) a history about a departure place and a destination of a guidance route and (ii) a history about a vehicular swept path; and
a determination unit for determining whether or not part or all of sections in the retrieved guidance route is a route frequented by an occupant of the vehicle based on the stored history information,
wherein, when part or all of sections in the retrieved guidance route is determined to be a route frequented by the occupant, the guidance mode selection unit selects the audio route guidance simplifying and omitting mode as a guidance mode for part or all of sections in the retrieved guidance route that is determined to be a route frequented by the occupant.

30. The car navigation system according to claim 29,
wherein, when the retrieved guidance route includes a departure place and a destination indicating a count greater than or equal to a specified value, the determination unit determines that a section from the departure place to the destination is a route specific to or frequented by the occupant.

31. The car navigation system according to claim 29,
wherein, when a vehicular swept path indicating a count greater than or equal to a specified value overlaps with the retrieved guidance route, the determination unit determines that an overlapping section is a route specific to or frequented by the occupant.

32. The car navigation system according to claim 29, further comprising:

a route learning unit for learning a route frequently traveled by the vehicle based on the history about a vehicular swept path, wherein, when part or all of sections in the retrieved guidance route corresponds to a route for learning by the route learning unit, the determination unit determines that the route for learning is a route specific to or frequented by the occupant.

33. The car navigation system according to claim 29, further comprising:

a guidance mode designation unit for designating one of (i) the normal mode and (ii) the audio route guidance simplifying and omitting mode, wherein, when the determination unit determines that part or all of sections in the retrieved guidance route is not a route frequented by the occupant, the guidance mode selection unit selects the one designated by the guidance mode designation unit.

34. The car navigation system according to claim 28, further comprising:

a guidance mode designation unit for designating one of (i) the normal mode and (ii) the audio route guidance simplifying and omitting mode, wherein the guidance mode selection unit selects the one designated by the guidance mode designation unit.

35. The car navigation system according to claim 28, wherein, when the audio route guidance simplifying and omitting mode is selected and when the route guidance unit provides route-related information using display guidance and audio guidance, the route guidance unit uses the audio guidance so as to make an occurrence frequency of audio guidance smaller than an occurrence frequency of audio guidance in the normal mode with respect to the route-related information.

36. The car navigation system according to claim 28, wherein, when the audio route guidance simplifying and omitting mode is selected and when the route guidance unit provides route-related information using display guidance and audio guidance, the route guidance unit uses the audio guidance so as to omit a less important part of the audio guidance in the normal mode with respect to the route-related information.

37. The car navigation system according to claim 28, wherein, when the audio route guidance simplifying and omitting mode is selected and when the route guidance unit provides route-related information using display guidance and audio guidance, the route guidance unit uses the audio guidance so as to simplify the audio guidance in the normal mode with respect to the route-related information.

38. The car navigation system according to claim 28, wherein, when traffic congestion information is acquired as the traffic-related information, the route guidance unit notifies at least a place of traffic congestion occurrence and a length of a traffic congested area.

39. The car navigation system according to claim 38, further comprising:

a detail map display designation unit for designating display of a detail map for the place of traffic congestion occurrence and its vicinity; and a detail map display control unit for controlling display of the detail map when receiving an instruction from the detail map display designation unit.

40. The car navigation system according to claim 38, further comprising:

a bypass route retrieval designation unit for designating retrieval of a bypass route to bypass the traffic congested area, wherein the route guidance unit uses display guidance and audio guidance, with respect to retrieval of the bypass route, wherein the route retrieval unit retrieves the bypass route when the bypass route retrieval designation unit designates retrieval of the bypass route after display guidance and audio guidance about retrieval of the bypass route, and wherein the route guidance unit uses display guidance and audio guidance about the bypass route.

41. A car navigation system provided in a vehicle, the car navigation system comprising:

a traffic-related information acquisition unit for acquiring traffic-related information about vehicular traffic;

a setting unit for setting a destination;

a route retrieval unit for retrieving a guidance route from a departure place to the set destination;

a route guidance unit for providing (i) route-related information about the retrieved guidance route using display guidance and audio guidance, and (ii) traffic-related information about the retrieved guidance route using display guidance and audio guidance when the traffic-related information about the retrieved guidance route is acquired by the traffic-related information acquisition unit;

a determination unit for determining whether or not part or all of sections in the retrieved guidance route is specific to an occupant of the vehicle; and a route-related information simplifying unit for simplifying route-related information about part or all of sections in the guidance route that is determined to be specific to the occupant, wherein the route guidance unit uses the simplified route-related information to perform audio guidance at least for part or all of sections in the retrieved guidance route that is determined to be specific to the occupant.

42. The car navigation system according to claim 41, wherein the route-related information simplifying unit simplifies the route-related information by editing the route-related information.

43. The car navigation system according to claim 41, wherein the route-related information simplifying unit simplifies the route-related information by anew creating route-related information.

44. A method for a navigation system provided in a vehicle, the navigation system including:

a traffic-related information acquisition unit for acquiring traffic-related information about vehicular traffic; and a setting unit for setting a destination, the method comprising:

retrieving a guidance route from a departure place to the set destination;

providing (i) route-related information about the retrieved guidance route using display guidance and audio guidance, and (ii) traffic-related information about the retrieved guidance route using display guidance and audio guidance when the traffic-related information about the retrieved guidance route is acquired by the traffic-related information acquisition unit;

determining whether or not part or all of sections in the retrieved guidance route is specific to an occupant of the vehicle; and simplifying route-related information about part or all of sections in the guidance route that is determined to be specific to the occupant, wherein the simplified route-related information is used to perform audio guidance at least for part or all of sections in the retrieved guidance route that is determined to be specific to the occupant.

* * * * *